United States Patent [19]
Vogt

[11] 3,935,610
[45] Feb. 3, 1976

[54] CLEANING APPARATUS FOR OVERHEAD RAILS

[76] Inventor: Norman H. Vogt, 457 Fisher Court, Clawson, Mich. 48017

[22] Filed: July 1, 1974

[21] Appl. No.: 484,939

[52] U.S. Cl. .................... 15/21 R; 15/21 E; 15/77
[51] Int. Cl.² .......................................... E01H 8/00
[58] Field of Search ...... 15/21 R, 50 C, 21 E, 50 R, 15/77, 97, 312 R; 118/72

[56] References Cited
UNITED STATES PATENTS

| | | | |
|---|---|---|---|
| 3,641,618 | 2/1972 | Rainey et al. ....................... | 15/77 X |
| 3,786,779 | 1/1974 | Brunel et al. ....................... | 15/77 X |
| 3,806,979 | 4/1974 | Bonami ............................... | 15/77 X |

*Primary Examiner*—Edward L. Roberts
*Attorney, Agent, or Firm*—William T. Sevald

[57] ABSTRACT

A cleaning apparatus for overhead conveyor rails particularly for meat packing plants having a traveler riding the rail and a cart moving below the traveler. The cart has tanks containing cleaning and oiling fluids; a hydraulic fluid reservoir; and a hydraulic pump driven by an electric motor. The traveler has a first brush driven by a hydraulic motor for scrubbing one side of a rail; a second brush driven by a hydraulic motor for scrubbing the other side of the rail; heads for spraying the rails with cleaning, rinsing, and oiling agents; grooved support-drive trolley wheels riding the rails and a hydraulic motor driving one trolley wheel. Lines between the cart and the traveler supply the traveler with agents and hydraulic power. A skin encloses the traveler containing spray and channeling used agents to a drain hose. A step-over mechanism supports one brush on the hanger-side of the rail and enables the brush to scrub closely to the hanger, move around the hanger, and re-engage the rail closely on the other side of the hanger. The cart has a hydraulic jack and the traveler has a socket receiving the jack shaft for lifting and lowering the traveler on rails. The traveler has mechanisms operated by the jack shaft which automatically disengages the brushes from the rail to facilitate mounting and removing the traveler on a rail.

7 Claims, 8 Drawing Figures

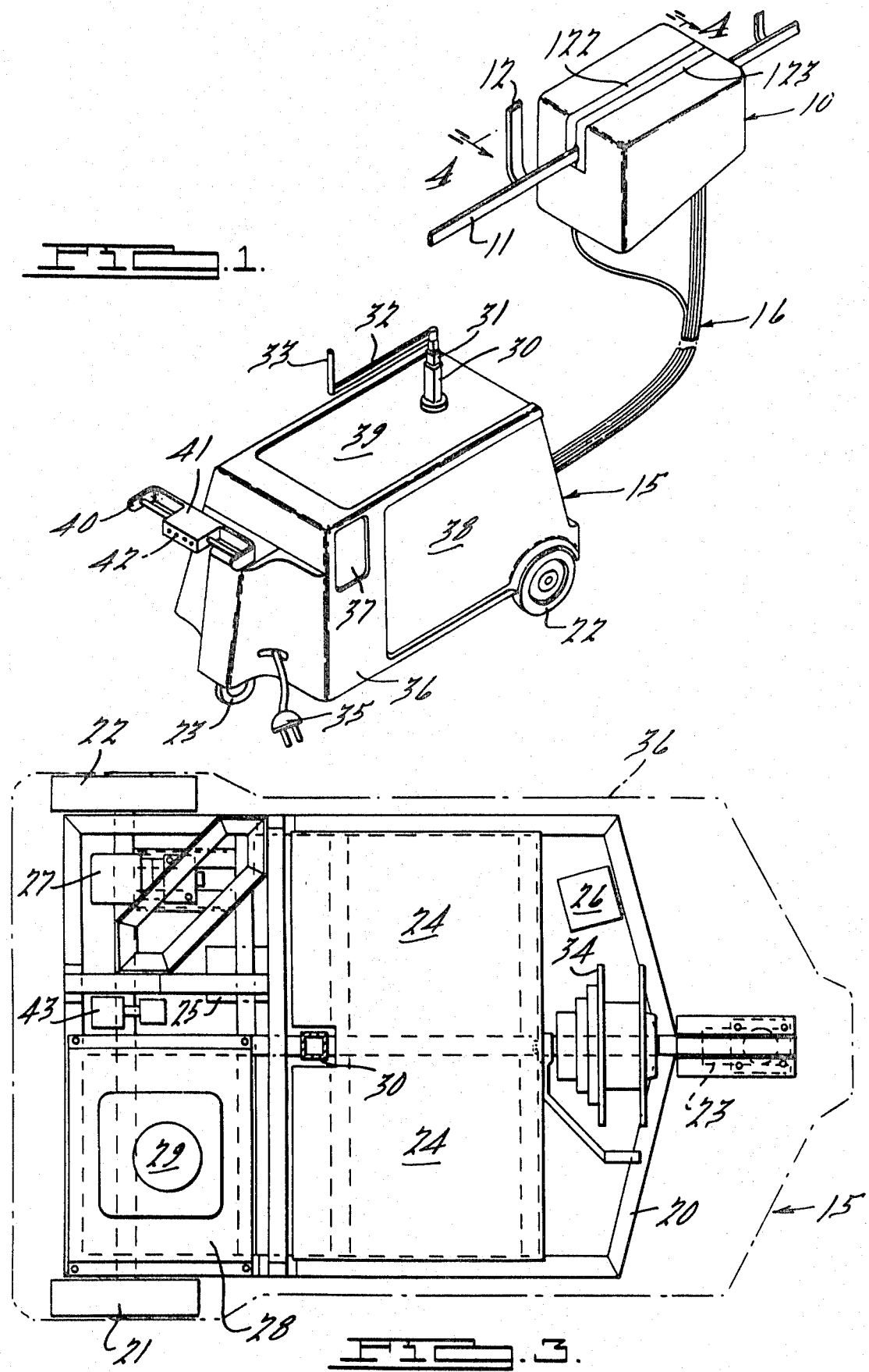

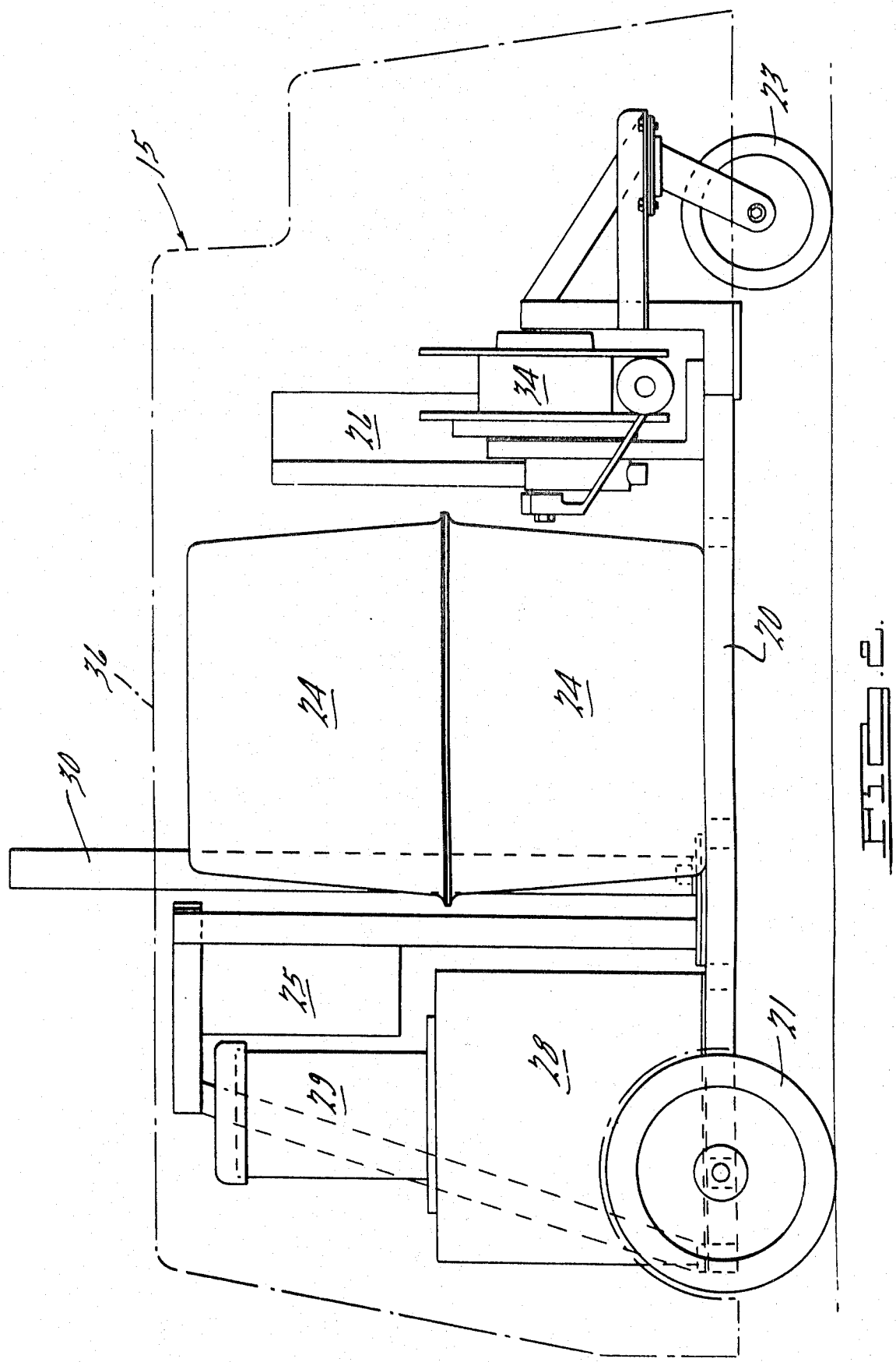

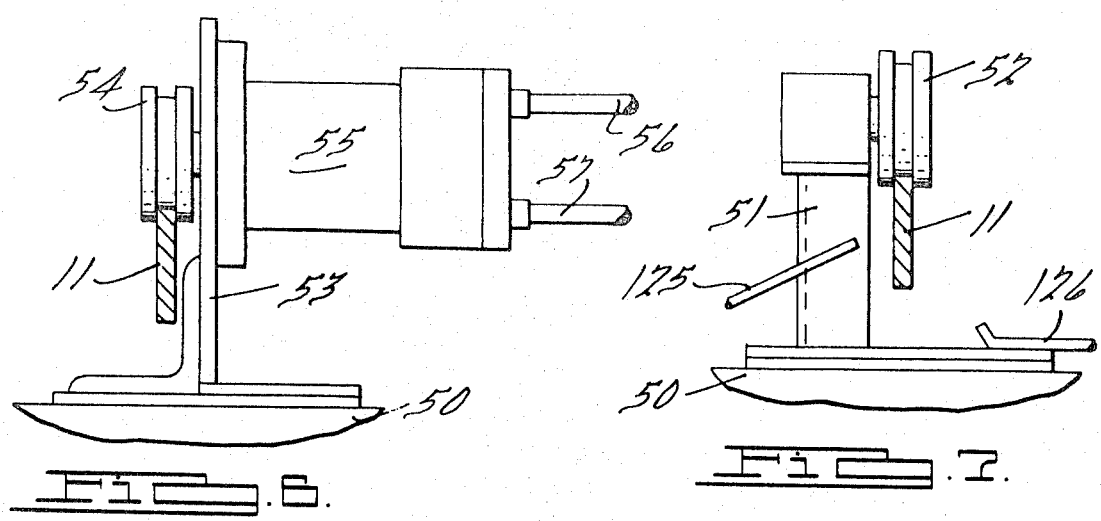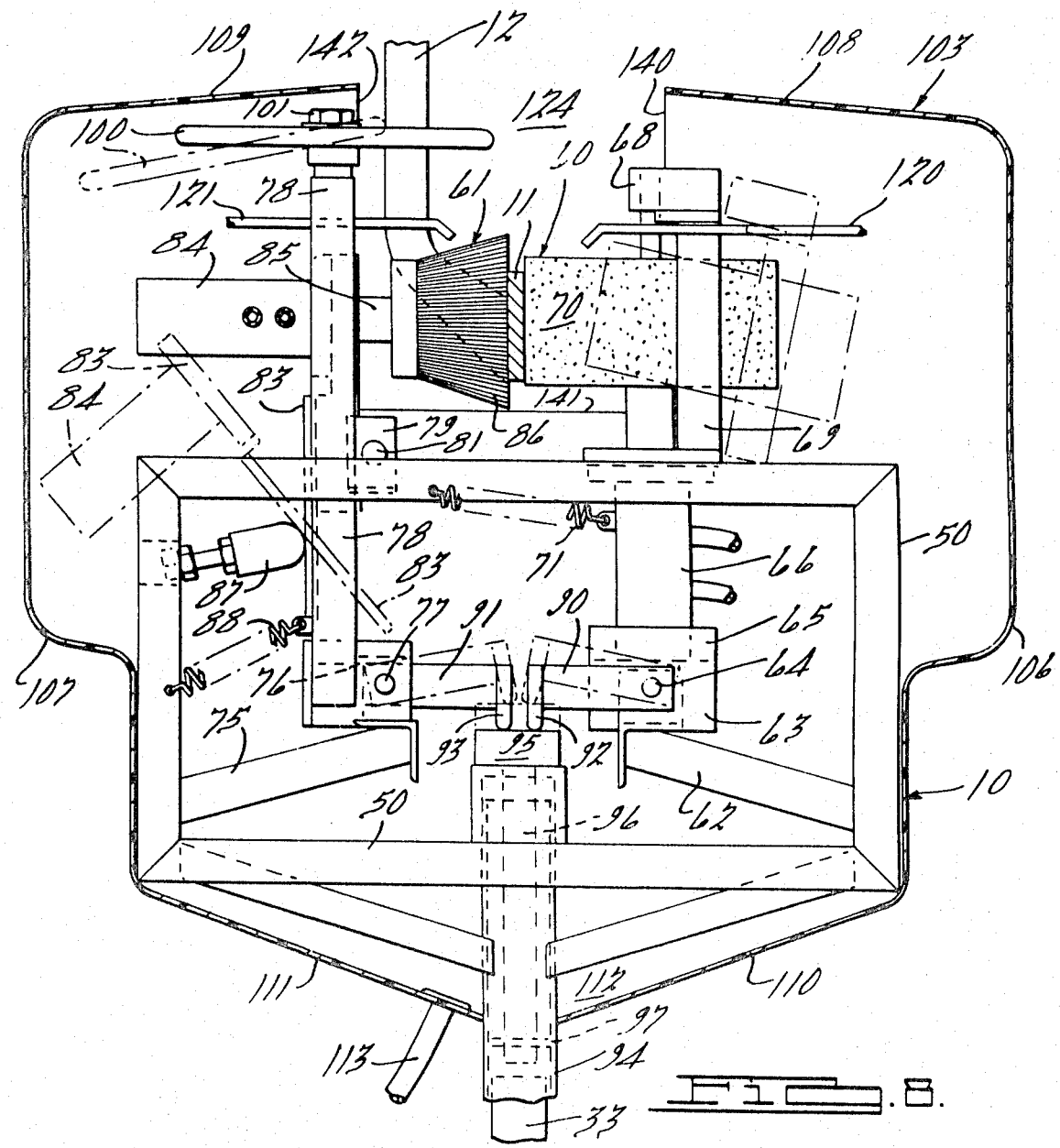

CLEANING APPARATUS FOR OVERHEAD RAILS

BACKGROUND OF THE INVENTION

Meat packing plants use overhead conveyor rails to move and store carcasses. The rails receive deposits of meat products such as blood, juice, grease, and oil from the carcasses and packing processes. Since the carcasses hang below the rails, the deposits on the rails are a contamination hazard as anything falling from the rail falls in the plane of the carcasses. Carcasses so contaminated are rejected by the meat inspectors. It is thus necessary to maintain the rails in a clean condition.

However, to manually clean the rails it is necessary that ladders or cleaning means on long poles be used by workmen. The brushes, mops, etc., employed in the manual process spray and slop cleaning agents and removed dirt over an area creating added contamination hazard. This situation becomes aggravated when a workman is cleaning a rail between other rails upon which carcasses are hanging. It thus becomes necessary to clear a large area around the rail being cleaned and this necessitates repeated changes and movements. In storage areas and rooms, the rails are so closely spaced that the carcasses abut one another in a mass of meat making it very difficult to clean a rail without clearing the whole area or room.

A dominant factor is that cleaning the rails in a meat packing plant is a very dirty and laborious job so that a workman's productivity quickly diminishes to an objectionable low level both as to the length of rails cleaned and the quality of the cleaning job.

SUMMARY OF THE PRESENT INVENTION

With the foregoing in view, an object of the invention is to provide cleaning apparatus for overhead conveyor rails particularly suitable for meat packing plants which is simple in design and construction, inexpensive to manufacture, and easy and efficient to use.

An object of the invention is to provide a traveler for riding the rail being cleaned which encases the scrubbing brushes and their drive motors, the trolley wheels and their drive motor, and cleaning, rinsing, and other agent spray heads, so that the traveler is able to move quickly along a rail at a controlled speed coordinated with the rotational speed of the brushes and the volume of the agents sprayed so that a large quantity of rail is cleaned with high quality thoroughness and efficiency.

An object of the invention is to provide a floor cart for movement with the traveler having supplies of cleaning, rinsing, and oiling agents, power supply for the motors in the traveler, and hoses and lines leading to the traveler from the cart.

An object of the invention is to provide power supply for the cart such as an electric cord leading to an electric motor on the cart or an internal combustion engine on the cart so that the cart may supply suitable power to the traveler as the traveler moves along a rail.

An object of the invention is to provide power means for mounting and dismounting the traveler on a rail comprising an elevator on the cart such as a hydraulic jack which raises and lowers the traveler relative to a rail and mechanisms in the traveler actuated by the jack shaft of the elevator when supporting the traveler which automatically retract the brushes from the rail so that they do not interfere with the mounting and dismounting of the traveler.

An object of the invention is to provide a step-over mechanism in the traveler for retracting the brush cleaning the side of the rail obstructed by hangers which support the rail at spaced intervals comprising a contact disc which upon contacting a hanger swings frames supporting the brush on the hanger side away from the rail at the hanger and swings that brush back into contact with the hanger side of the rail after bypassing the hanger.

An object of the invention is to provide power-operated rail cleaning apparatus to eliminate the human fatigue and diminishing efficiency factor so that the quantity and quality of rail cleaning is maintained at an efficient rate over long periods of time.

An object of the invention is to provide a cleaning apparatus for rails which encloses the cleaning operation so that dirt, agents, or other comtaminates do not escape enabling the cleaning to proceed without clearing large areas and other adjacent rails of carcasses.

DESCRIPTION OF THE DRAWINGS

The structure, operation, and objects of the invention will become apparent by reference to the detailed description of a cleaning apparatus for overhead conveyor rails hereinafter set forth taken in connection with the accompanying drawings, in which:

FIG. 1 is a perspective view of the traveler mounted on a rail with the rail and hangers broken away, a cart below the traveler, and service lines leading between the cart and traveler.

FIG. 2 is an enlarged side elevational view of the cart, showing its internal tanks, reservoirs, motor, and cable reel and indicating its outer body as seen in FIG. 1 in broken lines.

FIG. 3 is a reduced top plan view of the cart as seen in FIG. 2.

FIG. 6 is an enlarged partial cross-sectional view of the traveler as seen in FIG. 4, taken on the line 6—6 thereof, showing the idler trolley wheel and rail engagement, with parts broken away.

FIG. 7 is an enlarged partial cross-sectional view of the traveler drive trolley wheel and motor rail engagement taken on the line 7—7 of FIG. 4, with parts broken away; and FIG. 8 is a transverse vertical cross-sectional view of the traveler as seen in FIGS. 4 and 5, such as taken on the line 8—8 thereof, and additionally showing the jack shaft pivoted on the elevator mechanism of the cart in lifting position at the socket of the traveler and showing in broken lines the retracted position of the cleaning brushes and actuating mechanism from the rails effected when the traveler is lifted on the elevator mechanism.

DETAILED DESCRIPTION OF THE ILLUSTRATED EMBODIMENT

Figure 4:
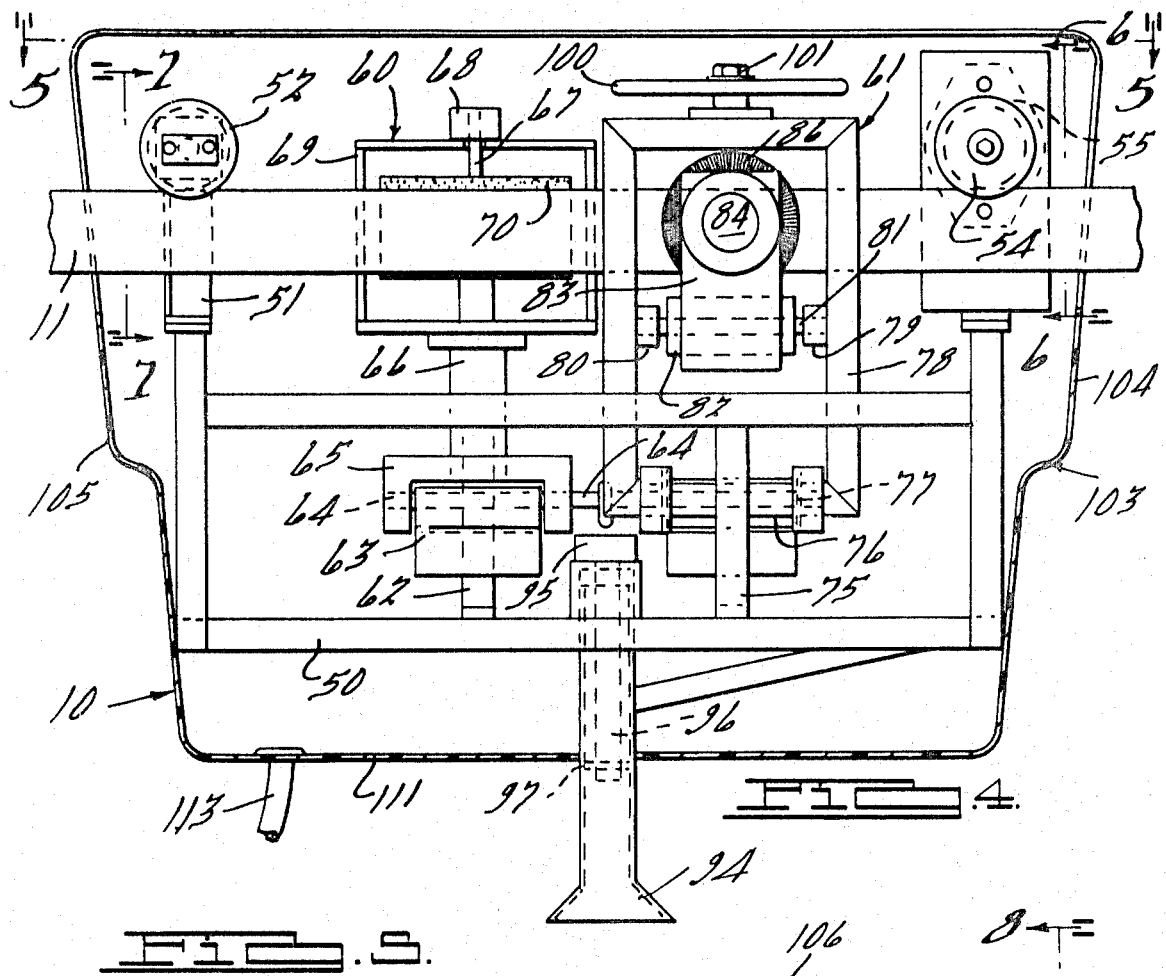
FIG. 4 is an enlarged vertical cross-sectional view of the traveler seen in FIG. 1, taken in the plane of the line 4—4 of FIG. 1, showing the mechanism from the back on the rail hanger obstructed side of the rail and the mechanism on the clear side of the rail from the front and beyond the rail.

Referring now the drawings wherein like numerals refer to like and corresponding parts throughout the several views, the exemplary cleaning apparatus for overhead rails shown therein to illustrate a preferred embodiment of the invention comprises, a traveler 10 containing the scrubbing and cleaning equipment. A rail 11 supports the traveler 10. Hangers 12 support the rail 11 by attachment to one side thereof. A wheeled cart 15 moves on the floor below the traveler 10 and contains cleaning fluid, rust preventative oil, and hydraulic power and supplies same to the traveler 10 via lines 16.

The cart 15, FIG. 1, has a chassis 20, FIG. 3, front wheels 21 and 22 and a rear caster wheel 23 supporting the chassis 20. A water tank 24, a detergent tank 25, and a rust preventative oil tank 26 are mounted on the chassis 20 and connected by hose lines to the traveler 10. A water pump and motor combination 27 is mounted on the chassis 20 and connected to the water tank 24 and the traveler 10. A venture connection from the detergent or cleaning fluid tank 25 leads to the line to the traveler 10 from the water pump 27 and meters detergent into the line leading to the traveler 10. A hydraulic fluid reservoir 28 is mounted on the chassis 20. A hydraulic pump and motor assembly 29 surmounts the reservoir 28. A rust preventative oil pump and motor combination 43 is connected to the oil tank and has a line leading to the traveler 10.

An elevator mechanism 30 is based on the chassis 20 and comprises a hydraulic cylinder and jack shaft 31. The hydraulic pump assembly 29 supplies pressure to the cylinder to raise the jack shaft 31. A crank-like arm 32 is pivotally connected to the jack shaft 31 and a pivot rod 33 extends upwardly from the arm 32 for insertion in a socket in the traveler 10, later described. An electric cord reel 34 is mounted on the chassis 20, and an electric cord 35 is carried thereon. A body 36 having suitable access doors 37 and 38 and a panel 39 is mounted on the chassis 20. A handle bar 40 is mounted on the body 36 over the caster wheel 23 for manual control of cart 15 movement. A switch panel 41 is mounted on the handle bar 40. Wires leading from the power cord 35 are connected to the panel 41 and wires are connected from the switch panel 41 to the hydraulic pump assembly 29, water pump assembly 27, and oil pump assembly 43. Switches 42 on the panel 41 provide the user with control of the various pump motors and the elevator assembly 30.

Figure 5:
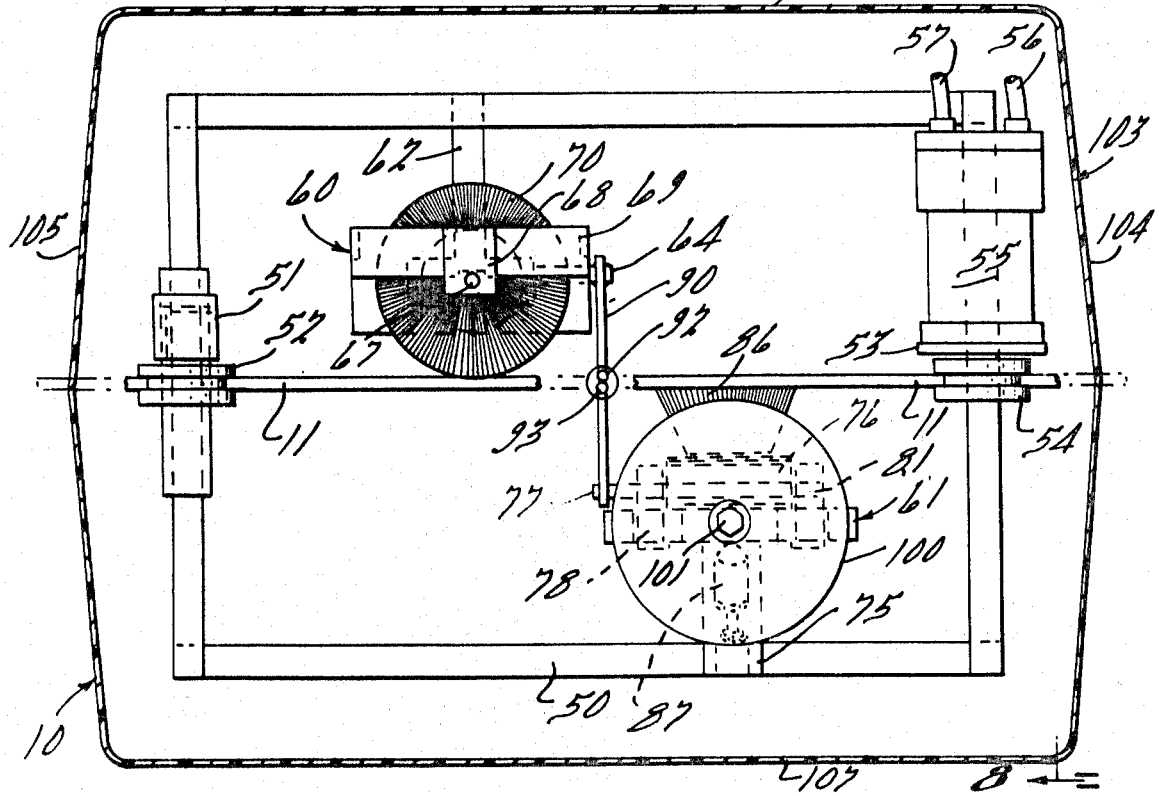
FIG. 5 is a horizontal cross-section of the traveler as seen in FIG. 4, taken on the line 5—5 thereof, showing the mechanism of the traveler from the top.

The traveler 10 comprises a frame 50, FIGS. 4–8. A post 51 on the frame 50 supports an idler grooved trolley wheel 52. The trolley wheel 52 rides on the rail 11 and supports the traveler 10 at one end. A plate 53 on the frame 50 at the end of the traveler 10 supports a grooved trolley drive wheel 54 which is bi-directionally driven by the hydraulic motor 55. Two lines 56 and 57 are connected to the motor 55, and lead to the hydraulic pump 29 on the cart 15. One switch 42 on the panel 41, FIG. 1, leads to a valve, not shown, between the pump 29 and motor 55 to control forward and reverse drive to move the traveler 10 along the rail 11 as desired.

An annular brush assembly 60 in the traveler 10 lies on the hanger 12-free side of the rail 11 and a cone brush assembly 61 in the traveler 10 lies on the hanger 12-impeded side of the rail 11. The annular brush assembly 60 includes a leg 62 on the frame 50 supporting a sleeve bearing 63. A shaft 64 lies free in the bearing 63. A yoke 65 is fixed on the shaft 64. A hydraulic motor 66 is mounted on the yoke 65. A drive shaft 67 from the motor 66 extends upwardly. A top bearing 68 supports the outer end of the shaft 67. A cage 69 connected to the top of the motor 66 supports the top bearing 68. An annular brush 70 on the drive shaft 67 abuts the rail 11. A spring 71 anchored on the frame 50 and connected to the motor 66 urges the assembly 60 toward the rail 11 to engage the brush 70 with the hanger-free side of the rail 11.

The cone brush assembly 61 includes an arm 75 extending from the frame 50 supporting a sleeve bearing 76. A shaft 77 is pivotally supported in the bearing 76. An outer case 78 is fixed on the shaft 77 at one end of the case 78 and extends upwardly therefrom. Aligned ears 79 and 80 on the outer case 78 have aligned apertures providing aligned pivot points. A pivot pin 81 lies in the apertures of the ears 79 and 80. A sleeve bearing 82 surrounds the pivot pin 81 between the ears 79 and 80. An inner plate 83 is fixed on the sleeve bearing 82 for pivotal movement therewith. A hydraulic motor 84 is fixed on the plate 83. A drive shaft 85, FIG. 8, extends from the motor 84 through the plate 83. A conical brush 86 is fixed on the drive shaft 85. A bumper block 87 abuts the inner plate 83 adjacent to and below the pivot pin 81. A spring 88 is anchored on the frame 50 and connected to the lower end of the inner plate 83. The spring 88 resiliently urges the inner plate 83 against the bumper block 87 which lever and fulcrum wise urges the upper end of the inner plate 83 toward the rail 11 and carries with it the outer case 78 via the pivot pin 81 and ears 79 and 80. This resiliently urges the conical brush 86 against the rail 11.

A bell-crank arm 90 connects at one end to the pivot shaft 64 supporting the annular brush assembly 60 and a bell-crank arm 91 connects at one end of the pivot shaft 77 supporting the conical brush assembly 61. The bell-crank arms 90 and 91 extend toward one another and their outer ends are equipped with bosses 92 and 93, respectively. A tubular socket 94 is fixed on the frame 50 below the bosses 92 and 93. A head 95 overlies the upper end of the socket 94 below the bosses and is normally spaced from the bosses 92 and 93. A lift pin 96 lies in the socket 94 and is connected to the head 95. The lift pin 96 lower end is spaced above the lower end of the socket 94. The socket 94 is adapted to receive the pivot rod 33 of the elevator mechanism 30 and the pivot rod 33 is adapted to engage the lower end of the lift pin 96 and move it upwardly in the socket 94 to urge the head 95 against the bell-crank bosses 92 and 93. A stop-ring 97 in the socket 94 engages the lift rod 33 and supports the traveler 10 on the lift rod 33 after the lift pin 96 has been moved the desired distance upwardly against the bosses 92 and 93 as indicated in broken lines.

The spring 88 is connected to the bottom end of the inner plate 83 and pulls the bottom end of the plate 83 toward the spring 88. The bumper block 87 engages the inner plate 83 between the spring 88 and the pivot pin 81. The block 87 thus provides a fulcrum point for the inner plate 83 and the inner plate 83 acts as a lever on the block 87 so that while the pull of the spring 88 on the lower end of the inner plate 83 urges the inner plate 83 outwardly relative to the rail 11, the lever action of the inner plate 83 on the block 87 urges the upper end of the inner plate 83 toward the rail 11. Since the pivot pin 81 interconnection to the outer case 78 is above the block 87 the outer case 78 is also urged toward the rail 11 as pivoted on the pivot pin 81. Thus both the inner plate 83 and the outer case 78 are resiliently urged toward the rail 11 by the spring 88.

A walk-over wheel 100 lies above the outer case 78 in the plane of the hangers 12. A stub shaft 101 on the outer case 78 freely rotatably mounts the wheel 100 on the outer case 78. When the wheel 100 encounters a hanger 12 as the traveler moves along the rail 11, it exerts sidewise outwardly tilting force on the outer case 78 and swings it out on the pivot pin 81 on along the radius as indicated by the broken line showing of the wheel 100, FIG. 8. This angular movement by the outer case 78 is transmitted to the inner plate 83 by the pivot pin 81 and ears 79 and 80. The bumper block 87 by abutting the inner plate 83 in this angular motion of the outer case 78 causes the inner plate 83 to pivot on the ears 79 and 80 and pivot pin 81 on a shorter radius between the pivot pin 81 and the bumper block 87 and this causes the inner plate 83 to swing a much larger angle outwardly as indicated by the broken line showing of FIG. 8. Since the motor 84 and conical brush 86 are mounted on the upper end of the plate 83, they also move angularly outwardly a greater angle than the outer case 78 and this greater angle of movement moves the conical brush 86 away from the rail 11 a sufficient distance to clear the plane of the hanger 12 and enables the conical brush to pass by the hanger 12 without interference from the hanger 12.

When the walk-over wheel 100 rides off the hanger 12 on the down stream side, the spring 88 levers the inner plate 83 on the bumper block 87 to swing the plate 83 on the bumper block 87 to swing the plate 83 on the pivot pin 81 and ears 79 and 80 toward the rail 11 and this also swings the outer case 78 on the pivot shaft 77 toward the rail 11 and this combined angular movement advances the conical brush 86 into contact with the rail 11 on the down stream side of the hanger 12.

The traveler 10 has a body sheel 103 on the frame 50 which has ends 104 and 105, sides 106 and 107, top flanges 108 and 109 which are spaced apart to allow clearance for the hangers 12 when in use cleaning rails 11 and for mounting and dismounting the traveler and rail 11, and inclined bottom panels 110 and 111 joining one another in a trough 112 which transmits gathered internal liquid to a drain hose 113.

Cleaning fluid spray nozzles 120 and 121, FIG. 8, are mounted on the annular brush assembly 60 and conical brush assembly 61, respectively, and are connected to the pump assembly 27 by the lines 16, FIGS. 1 and 3, leading between the cart 15 and traveler 10. The nozzles 120 and 121 spray cleaning fluid on either side of the rail 11 at the annular brush 70 and conical brush 86, respectively. The resulting grease, etc., and cleaning fluid mixture is contained within the traveler body 103 and exits through the drain hose 113 and preferably runs on the floor of the packing plant which is constructed with a plurality of floor drains for the purpose of washing the floors.

Flexible lips 122, 123, FIG. 1, made of resilient material are carried by the top flanges 108 and 109 of the traveler body 103 seen in FIG. 1, to close the space bounded by the edges of the opening 124 as indicated by the edge lines 140, 141, and 142 as seen in FIG. 8. The lips 122 and 123 are deleted in FIG. 8 to insure the clarity of the illustration of the apparatus shown therein. The lips 122 and 123 close the space 124 between the top flanges 108, 109 of the traveler 10 and at the ends 104 and 105 of the traveler 10. This space or opening 124 is indicated in FIG. 8 by the lines 140, 141, and 142.

Anti-rust spray nozzles 125 and 126 are mounted on the leg 51 and frame 50, FIG. 7, adjacent the idler trolley wheel 52 and are connected by tubes, not shown, to the lines 16 leading from the cart 15 to the traveler 10. The oil nozzles 125 and 126 are connected by these lines and tubes to the oil pump assembly 43 on the cart 15 which pumps the oil from oil tank 26 to the oil nozzles 125 and 126.

In operation, assuming that the traveler 10 is mounted on the rail 11, as shown in solid lines in the drawings, that the tanks 24, 25, and 26 are filled with their respective fluids, and that the cord 35 is connected to electrical power, the user throws the switches 42 on the panel 41 on the handle bar 40 and the pump assembly 27 pumps cleaning fluid to the nozzles 120 and 121, the pump assembly 43 pumps anti-rust oil to the nozzles 125, 126, and the hydraulic pump assembly 29 pumps hydraulic fluid to the hydraulic motor 54 to move the traveler 10 along the rail 11, to the hydraulic motor 66 to rotate the annular brush 70, and to the hydraulic motor 84 to rotate the conical brush 86 so that the traveler 10 is self-propelled along the rail 11 and sprays and scrubs the rail 11 clean as it goes and gives the rail 11 a protective anti-rust oil spray. The workman follows the traveler 10 by pushing the cart 15 along behind the traveler 10 to the extent of the cord 35 on the reel 34. The workman then plugs the cord 35 into a closer electrical outlet, and continues cleaning the rail 11.

To remove the traveler 10 from the rail 11, the workman locates the cart 15 below the traveler and actuates the elevator assembly 30 either manually by a hydraulic jack or by power from the hydraulic pump assembly 29 and the elevator mechanism raises the jack shaft 31, crank arm 32, and pivot rod 33 toward the traveler 10. By swinging the crank arm 32, FIG. 1, and jockeying the cart 15 and/or traveler 10, the pivot rod 33 is brought below the socket 94 on the traveler 10. The workman again raises the elevator mechanism 30 and the pivot rod 33 enters the socket 94 and comes into contact with the lift pin 96 at its bottom end below the stop-ring 97. Two sequential operations are now effected.

First, the pivot rod raises the lift pin 96 until its lower end is at the level of the stop-ring 97, and second, the pivot rod 33 engages the stop-ring 97.

In the first operation, when the lift pin 96 is raised at its bottom end to the level of the stop-ring 97, the top end of the lift pin raises the head 95 from its position shown in solid lines, FIG. 8, to its position shown in broken lines. In so moving, the head encounters and raises the bosses 92 and 93 on the bellcrank arms 90 and 91 swinging the arms 90 and 91 and pivoting the pivot shafts 64 and 77, respectively, to which they are secured. As the annular brush assembly 60 is fixed on the pivot shaft 64 and as the conical brush assembly 61 is fixed on the pivot shaft 77, this causes the brush assembly 60 and 61 to swing angularly from the solid line position shown away from the rail 11 to their positions indicated in broken lines, FIG. 8. In the case of the annular brush assembly 60, the annular swing is on the pivot shaft 64. In the case of the conical brush assembly 61, the first angular swing is made by the outer frame 78 on the pivot shaft 77 and the second angular swing is made by the inner plate 83 on the pivot pin 81 as fulcrummed against the bumper block 87. This first operation retracts both brush assemblies 60 and 61 from the rail 11 enabling the traveler 10 to be moved sidewardly of the rail 11.

In the second operation, further raising of the jack shaft 31 by the elevator mechanism 30 urges the pivot rod 33 against the stop-ring 97 and lifts the traveler 10 upwardly so that the trolley wheels 52 and 54 are lifted above the rail 11. With the trolley wheels 52 and 54 above the rail 11, the workman pushes the crank arm 32 of the elevator mechanism 30 to pivot the jack shaft 31 relative to the traveler 10 to move the trolley wheels 52 and 54 from their position over the rail 11 to a position sidewardly on the clear side of the rail 11 opposite to the hanger 12 side of the rail 11. The workman then lowers the elevator mechanism 30 and the traveler 10 is lowered past the rail 11 to a position below the rail 11 supported on the elevator mechanism 30 above the cart 15 with the brush assemblies 60 and 61 in retracted position.

To mount the traveler 10 on another rail 11, the workman wheels the cart 15 with the traveler 10 supported thereon to the selected rail 11. He then actuates the elevator mechanism to raise the traveler 10 to the height of the new rail 11. Since the brush assemblies 60 and 61 are in their retracted condition, the traveler 10 is internally clear to put the trolley wheels 52 and 54 on the rail 11. As the traveler is raised, the workman swings the traveler 10 via its socket 94 on the pivot rod 33 and also swings the crank arm 32 to align the traveler 10 parallel with the rail 11 and the space 124 and flexible lips 122, 123, in position to receive the rail 11. The workman raises the traveler until the trolley wheels 52 and 54 are slightly higher than the rail 11 and then pushes the traveler 10 sidewise as facilitated by the means pivotally and swingably supporting it until the trolley wheels 52 and 54 are above the rail 11. The two operations previously described now occur in reverse sequence and the trolley wheels 52 and 54 are first lowered onto the rail by the elevator mechanism 30. The pivot rod 33 is then lowered from the stop-ring 97 leaving the trolley wheels 52 and 54 to support the traveler 10 on the rail 11 and second, removing the pivot rod 33 from the lower end of the lift pin 96 allowing it and the head 95 to drop from the indicated broken line position to the solid line positions shown. This moves the head 95 out of contact with the bosses 92 and 93 allowing them to move from their broken line position to their position shown by solid lines and this allows the spring 71 and 88 to swing their respective brush assemblies 60 and 61 to move the brushes 70 and 86 into contact with the rail 11. The apparatus is now ready for use as previously described.

The elevator mechanism 30 has been described in mounting and dismounting the traveler 10 on the rail 11 as having a crank-like arm 32 supported on and swinging with the pivotally mounted jack shaft 31 and in turn supporting the pivot rod 33 on which the socket 94 of the traveler 10 pivots. While this is a preferred embodiment, the elevator mechanism may be simplified so that the jack shaft 31 itself enters the socket 94 of the traveler 10, actuates the brush retraction mechanism, and lifts and supports the traveler 10 by engagement with the lift pin 96 and the stop-ring 97. Other modifications may be made within the scope of the invention as defined by the appended claims. The claims define the protective scope of the invention.

I claim:

1. Rail scrubbing apparatus for cleaning a rail having a hanger side and a clear side, comprising,
   a traveler,
   a frame in said traveler having spaced bearings,
   an axle in each said bearing having an end projecting therefrom,
   a trolley wheel on each said projecting end of each said axle cantilevered relative to said bearings allowing said trolley wheels to be mounted on and taken off a rail from the one clear side of the rail and to travel along a rail without obstruction from hangers on the opposite side of a rail;
   a travel motor mounted on said frame connected to one said axle and trolley wheel to rotate said trolley wheel to move said frame along a rail,
   a first brush,
   first means rotationally mounting said first brush on said frame for scrubbing the clear side of a rail including a first brush motor connected to said first brush to rotate said first brush relative to the clear side of a rail,
   a swing case pivoted on said frame on the hanger side of a rail,
   a second brush,
   second means rotatably mounting said second brush on said swing case including a second brush motor connected to said second brush for rotating said second brush relative to the hanger side of a rail, and
   hanger contact-walk-over means on said swing case to intercept hangers on the hanger side of a rail and to swing said case and second brush sidewise outwardly from a rail at hangers to permit said second brush to by-pass hangers;
   pivot mounting means swingably mounting said first brush, said first brush mounting means, and said first brush motor to move them sidewise outwardly from the clear side of a rail,
   a first bell-crank arm on said pivot means,
   a second bell-crank arm on said swing case, and
   actuator means on said frame for moving said bell-cranks to pivot said pivot mounting means and said swing case to move their respective brushes sidewise outwardly of a rail to eliminate interference by said brushes in mounting and dismounting said traveler on a rail.

2. In an apparatus as set forth in claim 1, said actuator means comprising,
   a socket on said frame for receiving the shaft of an elevator mechanism,
   a lift pin in said socket for contacting said bell-cranks, and
   a stop in said socket for supporting said traveler on a shaft,
   said lift pin having a bottom end depending below said stop;
   said lift pin thereby being movable by a shaft to move said bell-cranks to move said brushes away from a rail prior to a shaft contacting said stop to lift said traveler.

3. In an apparatus as set forth in claim 2,
   a cart for movement on a floor below said traveler and an elevator mechanism on said cart having a shaft for entering said socket and lifting said traveler in mounting and dismounting said traveler on a rail.

4. In an apparatus as set forth in claim 3,
   said shaft being pivotally mounted and having an off-set crank bend; said shaft having an end pivotally received in said socket; said end of said shaft being swingable with said crank bend and pivotable on said socket to locate said traveler with its trolley wheels aligned with a rail in mounting and dismounting.

5. Rail scrubbing apparatus for cleaning a rail having a hanger side and a clear side, comprising, a traveler, a frame in said traveler having spaced bearings, an axle in each said bearing having an end projecting therefrom, a trolley wheel on each said projecting end of each said axle cantilevered relative to said bearings allowing said trolley wheels to be mounted on and taken off a rail from the one clear side of the rail and to travel along a rail without obstruction from hangers on the opposite side of a rail;

a travel motor mounted on said frame connected to one said axle and trolley wheel to rotate said trolley wheel to move said frame along a rail, a first brush, first means rotationally mounting said first brush on said frame for scrubbing the clear side of a rail including a first brush motor connected to said first brush to rotate said first brush relative to the clear side of a rail, a swing case pivoted on said frame on the hanger side of a rail, a second brush, second means rotatably mounting said second brush on said swing case including a second brush motor connected to said second brush for rotating said second brush relative to the hanger side of a rail, and hanger contact-walk-over means on said swing case to intercept hangers on the hanger side of a rail and to swing said case and second brush sidewise outwardly from a rail at hangers to permit said second brush to by-pass hangers;

at least one nozzle on said traveler for spraying liquid on the rail, and a body skin on said frame inclosing said brushes and said nozzle for containing and collecting spray from said brushes and said nozzle.

6. In an apparatus as set forth in claim 5, a cart for movement on the floor below said traveler, a water tank on said cart, and an oil tank on said cart;

said traveler having water and oil nozzles;

a hose leading from each said tank respectively to each said nozzle, and means on said cart for forcing water and oil from said tanks on said cart to said nozzles on said traveler.

7. In an apparatus as set forth in claim 5, a cart for movement on the floor below said traveler, a hydraulic reservoir and pump on said cart, means on said cart for driving said hydraulic pump;

said brush motors and travel motors being hydraulically driven; and lines leading from said hydraulic pump on said cart to said hydraulic motor on said traveler.

* * * * *